April 24, 1928.
T. K. CUMMINS
WIRE CLAMP
Filed Nov. 10, 1926
1,667,345
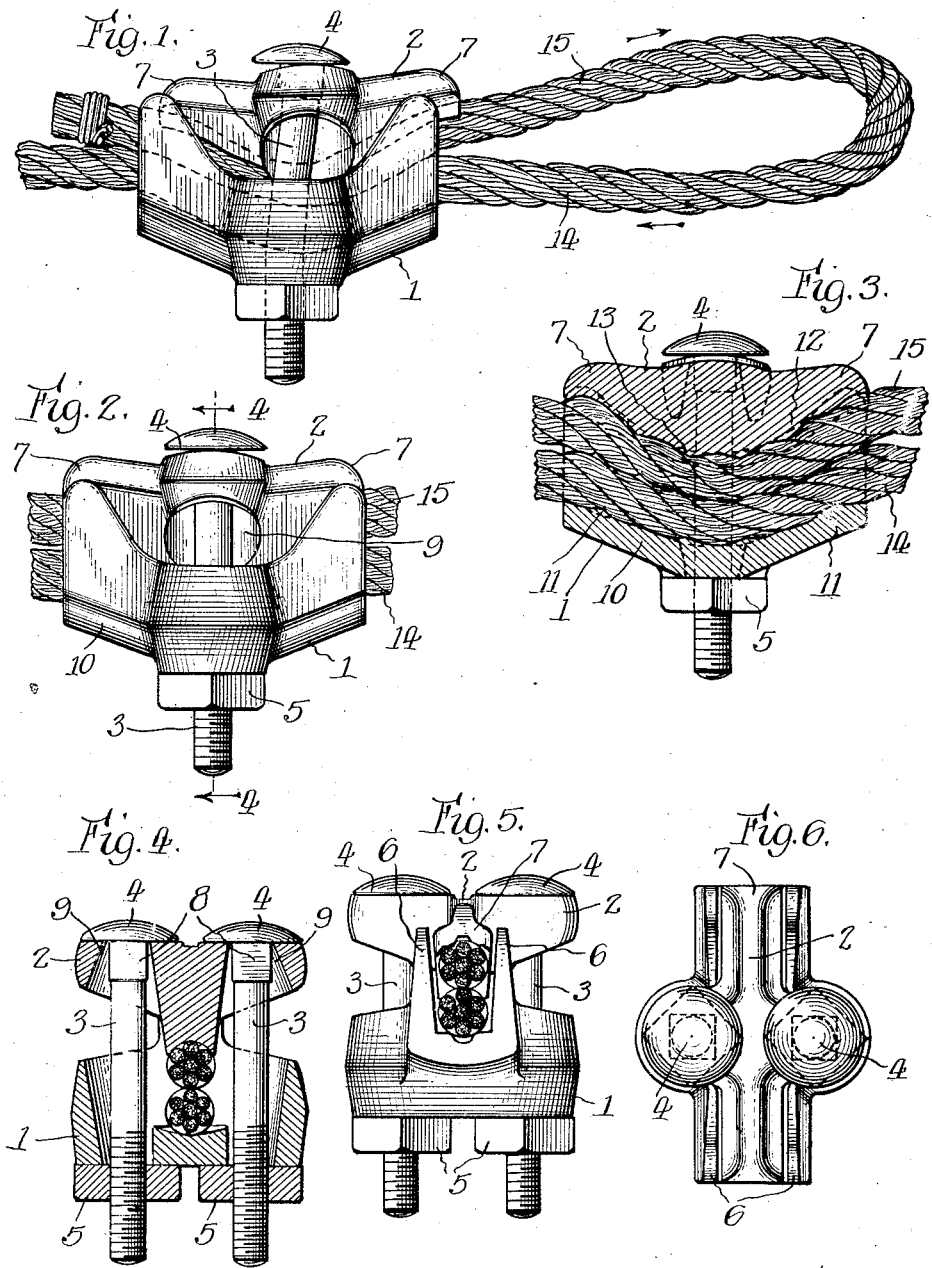
Inventor:
Thomas K. Cummins, Patented Apr. 24, 1928.

1,667,345

UNITED STATES PATENT OFFICE.

THOMAS K. CUMMINS, OF ST. PAUL, MINNESOTA, ASSIGNOR TO NORTHERN MALLEABLE IRON COMPANY, OF ST. PAUL, MINNESOTA, A CORPORATION OF MINNESOTA.

WIRE CLAMP.

Application filed November 10, 1926. Serial No. 147,597.

My invention relates to wire clamps or like devices.

One of the objects of the invention is to provide a simple, practical and advantageous device of the class specified.

Another object of the invention is to arrange for the effective gripping or clamping of the wire by the device and furthermore to secure such effective gripping or clamping by the pull or tension applied to the wire or cable in the use of the device.

Another object of the invention is to secure an effective gripping or clamping action in the device in such a manner that the wires or cables or one of the same will not be torn or broken by reason of the strain imposed upon it.

Another object of the invention is to secure simplicity of construction and inexpensiveness in manufacture.

In the accompanying drawings:

Fig. 1 is a view of a wire clamp or like device embodying my invention with a wire rope or cable gripped or clamped in position;

Fig. 2 is a view of the device with a wire rope or cable in it ready for gripping;

Fig. 3 is a longitudinal section of the device as shown in Fig. 2;

Fig. 4 is a cross section taken on line 4—4 in Fig. 2;

Fig. 5 is an end view of the device; and

Fig. 6 is a plan view of the same without the cable or rope.

Referring to the drawings I show a wire clamp or like device comprising lower and upper members 1 and 2 together with bolts 3—3 cooperating with said members 1 and 2, said bolts 3—3 having heads 4—4 and threaded nuts 5—5.

The members 1 and 2 are equipped with means for preventing a side or crosswise movement relatively to one another and also for permitting a longitudinal movement. As one arrangement for this I show the bottom member 1 provided with upstanding fingers or members 6—6 arranged at opposite ends of said member and forming guideways for the end portions 7—7 of member 2. This permits a relative sliding movement of member 2 with respect to member 1, this sliding movement on the part of member 2 being permitted to a certain extent by the bolts 3—3 in that said member 2—2 may by its movement swing the bolts 3—3 slightly about their lower end portions. The rigidity of these bolts, however, prevents any substantial extent of movement on the part of member 2,—in other words the bolts limit such longitudinal movement of member 2 relatively to member 1. Beyond the moderate extent of movement permitted by bolts 3—3, such bolts would bend if the movement were carried further.

The bolts 3—3 are preferably provided with end portions 8—8 which are not round but are polygonal and the upper member 2 is preferably provided with sockets 9—9 into which the polygonal or square end portions 8—8 of the bolts may fit. This arrangement prevents a rocking or rotary movement on the part of member 2 relatively to said bolts and makes sure that such movement as the part 2 may have shall be substantially longitudinal, that is, lengthwise of members 1 and 2 as above described.

The lower member 1 is provided with a concave seat 10 which is preferably roughened as by providing it with moderate elevations 11—11 and the upper member 2 is provided with a convex seat 12 likewise preferably roughened as by providing it with projections 13—13. These two seats 10 and 12 form a channel for the two wire strands 14 and 15 which channel is preferably double curved in a concave manner by reason of the concavity of the seat 10 and the convexity of the seat 12.

The curvature of the concave seat 10 and of the convex seat 12 is preferably not the same, the seat 10 being preferably more obtuse or flat and the seat 12 more acute or angular, as it may be said, said seats 10 and 12 being preferably formed as parts of circles whereof the radius of the circle of seat 10 is greater or longer than the radius of seat 12.

By this arrangement the operation and use of the device will be as follows:

One or more rope strands, two being shown in the figures, may be placed in position in the channel formed by members 1 and 2 and between the concave and convex seats of said members and then the bolts 3—3 may be put in place by passing them through the proper apertures in said members 1 and 2 and then nuts 5—5 may be applied and turned until the wire or cable strands are clamped and gripped firmly in position. In this way the wire ropes or cables will be firmly held and prevented from slipping relatively to one another and relatively to the device or its parts under ordinary circumstances. If, however, an excessive strain be put on one or both of the wire or cable strands or if by reason of long use the wires or strands become somewhat smaller or the bolts 3—3 somewhat elongated, a tendency to slip will exist and this would result in slippage except for the peculiar construction and arrangement of the device by which such slippage is prevented and the grip of the device on the cables or ropes automatically maintained so as to prevent such slippage. This is due to the fact that at such times or under such conditions the pull or strain on the cables or wires will cause a longitudinal movement of member 2 relatively to member 1 as shown in Fig. 1 and this longitudinal movement will automatically cause a tight gripping or clamping of the cables or wires because of the action of the inclined seats 10 and 12 when said member 2 moves longitudinally relatively to member 1. Due to this relative longitudinal movement the wires or cables are gripped more firmly and securely the greater the pull exerted, the longitudinal movement tending to lessen the distance between the similarly inclined portions of seats 10 and 12 and so gripping the wires or cables more firmly between such seat portions. Due to the substantial length of the seat portions which actually engage and grip the wires or cables, such gripping takes place for a substantial distance along each wire or cable and hence the wires or cables are not gripped or bitten at a small point or surface which would tend to break or tear or rupture them, the substantial surfaces shown being of such length as to distribute the gripping effect and so prevent breaking, tearing and rupturing. This effect is emphasized by the prevention of a rocking movement on the part of the member 2 relatively to the bolts 3—3, the movement of such part 2 being as stated a substantially longitudinal one which insures the effective gripping action mentioned. If the movement permitted or caused by the conditions developed is such as to allow or bring about a longitudinal movement of member 2 greater than permitted by bolts 3—3 without bending, such bolts will actually be bent in the action of the device as shown in Fig. 1, this bending taking place and to an extent distorting the bolts but nevertheless accomplishing the effective automatic gripping action which actually prevents slippage of the wires or cables relatively to one another and to the device, no matter what conditions arise by long use.

It will be seen that this automatic gripping action will be accomplished no matter which way the pull or strain on the cables or wires may be made. In Fig. 1 the strain on the upper wire 15 is to the right and on the lower wire 14 to the left, and the member 2 is moved to the right relatively to member 1; but obviously the reverse action may take place upon a reversal of the direction of the strands or cables 14 and 15, in which case the member 2 would move to the left relatively to member 1, this double result being secured because of the compound character of the seats 10 and 12, both being inclined upwardly at opposite ends.

It will be understood that changes and modifications may be made without departing from the spirit of the invention.

What I claim is:

1. A device of the class specified comprising upper and lower gripping members one of which is provided with holding and guiding means between which the ends of the other member may fit and slide longitudinally, said members having wire or cable engaging seats between which the wires or cables may be gripped, said guiding means forming recesses for the ends of the other member at least as wide as the ends of said member to permit free movement of the members toward one another and also having inclined seats adapted to grip the wires or cables more firmly as the result of a relative longitudinal movement of said upper and lower members and bolt members for holding said gripping or clamping members in position and permitting relative longitudinal movement between the same.

2. A device of the class specified comprising upper and lower gripping members one of which is provided with longitudinally extending guides forming guideways in which the opposite ends of the other member may move or slide longitudinally, said members being provided with inclined seats for gripping the wires or cables and bolt members holding said gripping members in proper relative position and permitting the longitudinal sliding movement of said members relatively to one another to secure gripping action.

3. A device of the class specified comprising upper and lower gripping members one of which is provided with substantially vertical guides forming guideways in which portions of the other member may slide longitudinally, said guideways having their side walls spaced apart at least the width of said portions to permit free movement of the members toward and away from one another said members being provided with inclined gripping seats and bolt members passing through the sides of said gripping members and permitting relative longitudinal movement between the same to secure greater gripping action.

4. A device of the class specified comprising upper and lower gripping members one of which is provided with a longitudinal guideway and the other of which is relatively narrow and adapted and arranged so that its body portion may move in said guideway and bolt members passing through the sides of said gripping members and permitting relative longitudinal movement between the same.

5. A device of the class specified comprising upper and lower gripping members provided with means for permitting a relative longitudinal movement with respect to one another, said members being provided with dissimilarly inclined gripping seats adapted to vary the gripping action as one of said members is moved relatively to the other.

6. A device of the class specified comprising upper and lower gripping members one of which is provided with guiding means for permitting a longitudinal movement of the other, said members being provided the one with a concave seat and the other with a convex seat of more acute curvature than the concave seat of the lower member and bolts passing through said gripping members and adapted to permit said longitudinal movement to secure greater gripping action.

7. A device of the class specified comprising upper and lower gripping members whereof the lower member is provided with upwardly extending guide fingers forming end guideways with substantially parallel walls for the longitudinal movement of the upper member, said members being provided the one with a concave seat and the other with a convex seat of more acute curvature than the concave seat of the other member and bolts passing through said gripping members and adapted to permit longitudinal movement on the part of upper member relatively to the lower member.

8. A device of the class specified comprising upper and lower gripping members provided with cooperating guiding devices for effecting longitudinal movement of said members relatively to one another, said gripping members having cooperating gripping surfaces, bolt members engaging said gripping members, said bolt and gripping members being constructed and adapted to permit a relative longitudinal movement of one gripping member relatively to the other and to cause the swinging movement of one gripping member toward the other gripping member by reason of the bolt engagement of said members, when a longitudinal movement between said two members takes place.

9. A device of the class specified having upper and lower gripping members one of which has guides in which the other member may fit and slide longitudinally, said gripping members having inclined gripping seats to increase the gripping action upon a relative longitudinal movement of said members.

10. A device of the class specified having longitudinally movable gripping members one of which has guides in which the other member may fit and slide, one of said members having a concave gripping seat and the other having a convex gripping seat, cooperating with said concave seat.

11. A device of the class specified having longitudinal movable gripping members and provided with longitudinally extending cooperating guiding devices to effect relative longitudinal movement of said members and bolt means for holding the same together and permitting relative longitudinal movement of said members, said members being provided with curved gripping surfaces forming a channel or passage into which the wire or cable is fitted in a bent condition, whereby strain on the wire or cable and longitudinal movement of one gripping member relatively to the other will increase the gripping action on the bent portion of the wire or cable.

12. A device of the class specified having cooperating and longitudinally movable gripping members and provided with longitudinally extending cooperating guiding devices to effect relative longitudinal movement of said members and bolt devices for holding said members together and permitting longitudinal movement thereof, said gripping members having cooperating gripping seats whereof the seat of one member is concave with its lowest portion in the middle of the member and its highest portions at the opposite ends of the member and whereof the seat of the other member is convex with its lowest portion at the middle of the member and its highest portion at the opposite ends of the member.

13. A device of the class specified comprising upper and lower gripping members, one of which is provided with longitudinally extending guides extending transversely of said members and engaging the other member to effect relative longitudinal adjustment of said members, said members being provided with convex and concave gripping surfaces and bolts extending transversely of said members, said members being provided with enlarged bolt holes permitting relative longitudinal adjustment of the members.

14. A device of the class specified comprising upper and lower gripping members whereof the lower member is provided with upwardly extending guides adapted to engage the opposite sides of the other member to permit relative longitudinal movement of said members, and bolts for holding the members together, said members being provided with concave and convex gripping surfaces and also with side apertures through which said bolts may be extended.

15. A device of the class specified comprising upper and lower gripping members having convex and concave cooperating gripping surfaces, the lower member having its ends provided with upwardly extending guide fingers adapted to engage the end portions of the upper gripping member and permit longitudinal sliding movement of said members and bolts for holding the members together, said members both being provided with side bolt apertures located between their ends, the apertures in both members being arranged in a vertical manner and the upper member apertures being flared downwardly and the lower member apertures being flared upwardly to permit longitudinal gripping action on the part of said members.

In witness whereof, I hereunto subscribe my name this 21st day of October, A. D., 1926.

THOMAS K. CUMMINS.